No. 788,219. PATENTED APR. 25, 1905.
G. L. OGLE.
SCREEN.
APPLICATION FILED JULY 18, 1904.
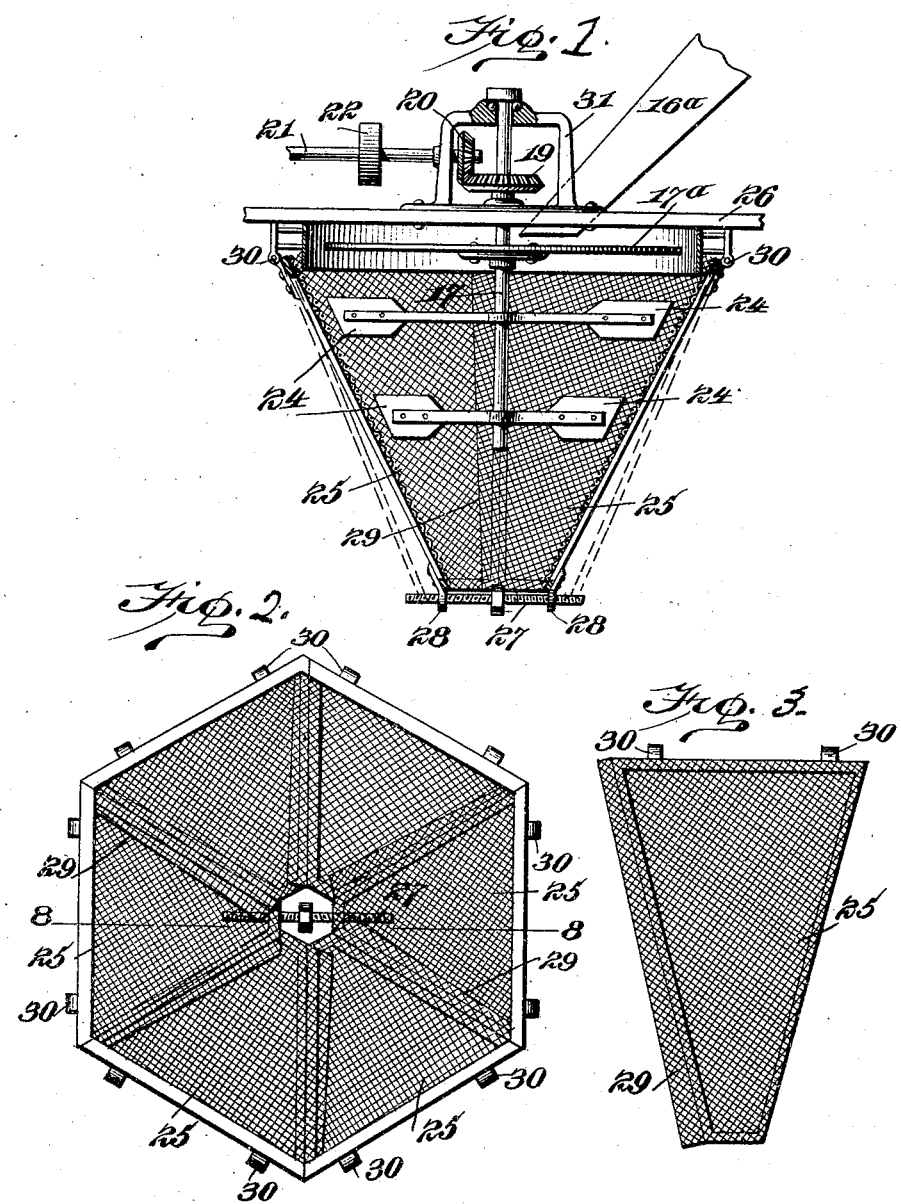

No. 788,219. Patented April 25, 1905.

UNITED STATES PATENT OFFICE.

GRAHAM L. OGLE, OF LOUISVILLE, KENTUCKY.

SCREEN.

SPECIFICATION forming part of Letters Patent No. 788,219, dated April 25, 1905.

Application filed July 19, 1904. Serial No. 217,258.

*To all whom it may concern:*

Be it known that I, GRAHAM L. OGLE, a citizen of the United States, residing at Louisville, in the county of Jefferson and State of Kentucky, have invented certain new and useful Improvements in Screens, of which the following is a specification.

This invention relates to screens.

An object of the invention is to provide a screen-surface in the form of an inverted frustum having a discharge at its lower end and a variable inclination. The purpose of varying the inclination is to provide a screen-surface adapted for the separation of various materials.

Other objects will appear from the following description and will be particularly pointed out in the appended claims.

In the drawings, Figure 1 is a vertical section on the line 8 8, Fig. 2, showing one embodiment of my invention. Fig. 2 is a top plan view of the embodiment shown in Fig. 1 with the distributing-disk and the operating mechanism removed, and Fig. 3 is an elevation of one of the screen-sections employed in the embodiment shown in Figs. 1 and 2.

The screen-surface in the embodiment shown has the shape of a frustum of a pyramid, each side of which is formed by a flat screen-section 25. The screen-sections 25 are removable and hinged at their upper ends at 30 to the top 26, while at their lower ends two opposite sections are connected by an adjusting device which comprises a right and left hand screw 27, that works through nuts 28 on the sections. Each section 25 is further provided along one of its sides with overlapping fabric extensions 29, which serve to cover the space between the sections when the screen-sections are in their various positions.

A distributing-disk $17^a$ is suspended, by means of a shaft 17 and a bracket 31, in which the shaft is journaled, from the top 26. The shaft 17 carries two fan-blades 24 and a gear 19, with which meshes a gear 20 on power-shaft 21, the power-shaft being driven by pulley 22.

Surrounding the disk $17^a$ and depending from top 26 is a flange 32, that prevents the escape of the material above the upper ends of the screen-sections. The spout $16^a$ conducts the material directly to the disk $17^a$.

It will be seen that by adjusting the screw 27 the lower ends of the screen-sections may be drawn nearer to one another or moved away from one another, whereby the material may be held at a greater or less length of time upon said screen-sections.

The material—such as phosphate-rock after being ground, tankage acid phosphate, sand, cement-rock, coal, grain, &c.—is fed to a rotary disk $17^a$, from which it is thrown by centrifugal force onto the non-rotatable screen-surface and there subjected to a blast by fan-blades 24.

I desire it to be understood that I do not desire to be limited to the embodiment herein shown and that I may make various changes, within the scope of the appended claims, in the form and the construction without departing from the spirit of or sacrificing any of the advantages of my invention.

Having thus described my invention, what I claim is—

1. The combination of a screen-surface in the form of an inverted frustum having an inlet at its top and a discharge at its bottom, and composed of a plurality of abutting screen-sections arranged in an endless series, and means for moving the sections to vary the inclination of the entire screen-surface.

2. The combination of a screen-surface in the form of an inverted frustum having an inlet at its top and a discharge at its bottom, and composed of a plurality of abutting screen-sections arranged in an endless series, means for moving the sections to vary the inclination of the entire screen-surface, and fabric extensions on the sides of the screen-sections for covering the spaces between the sections when in the various positions.

3. The combination of a screen-surface in the form of an inverted frustum having an inlet at its top and a discharge at its bottom, means for varying the inclination of the entire screen-surface, and means for distributing material on the inner surface of the screen.

4. The combination of a screen-surface in the form of an inverted frustum having an inlet at its top and a discharge at its bottom, means for varying the inclination of the entire screen-surface, and a rotary disk for distributing material on the inner surface of the screen.

5. The combination of a screen-surface in the form of an inverted frustum having an inlet at its top and a discharge at its bottom, means for varying the inclination of the entire screen-surface, means for distributing material on the inner surface of the screen, and means for causing a blast to act on the material while on the screen.

6. The combination of a screen-surface in the form of an inverted frustum having an inlet at its top and a discharge at its bottom, means for varying the inclination of the entire screen-surface, a rotary shaft surrounded by the screen-surface, a disk carried by the shaft, and fan-blades carried by the shaft.

7. A non-rotatable screen-surface in the form of an inverted frustum having a discharge at its bottom and divided into a plurality of sections adjustable to vary the inclination of the screen-surface.

8. A non-rotatable screen-surface in the form of an inverted frustum having a discharge at its bottom and divided into a plurality of sections adjustable to vary the inclination of the screen-surface, and means for distributing material over the inner surface of the screen.

The foregoing specification signed this 27th day of June, 1904.

GRAHAM L. OGLE.

In presence of—
JOHN RANDOLPH,
J. OTIS WILLIAMSON.